Dec. 24, 1968   J. B. FARR ET AL   3,418,626
OPTICAL DECONVOLUTION OF SEISMIC RECORDS
Filed Dec. 27, 1967   3 Sheets-Sheet 1

JOHN B. FARR
HAROLD M. LANG
MOSES B. WIDESS
    INVENTORS

BY *Newell Pottoff*

ATTORNEY

Dec. 24, 1968  J. B. FARR ET AL  3,418,626
OPTICAL DECONVOLUTION OF SEISMIC RECORDS
Filed Dec. 27, 1967  3 Sheets-Sheet 2

INVENTORS:
JOHN B. FARR
HAROLD M. LANG
MOSES B. WIDESS

BY

*Newell Ortoff*
ATTORNEY

Dec. 24, 1968     J. B. FARR ET AL     3,418,626
OPTICAL DECONVOLUTION OF SEISMIC RECORDS
Filed Dec. 27, 1967                    3 Sheets-Sheet 3
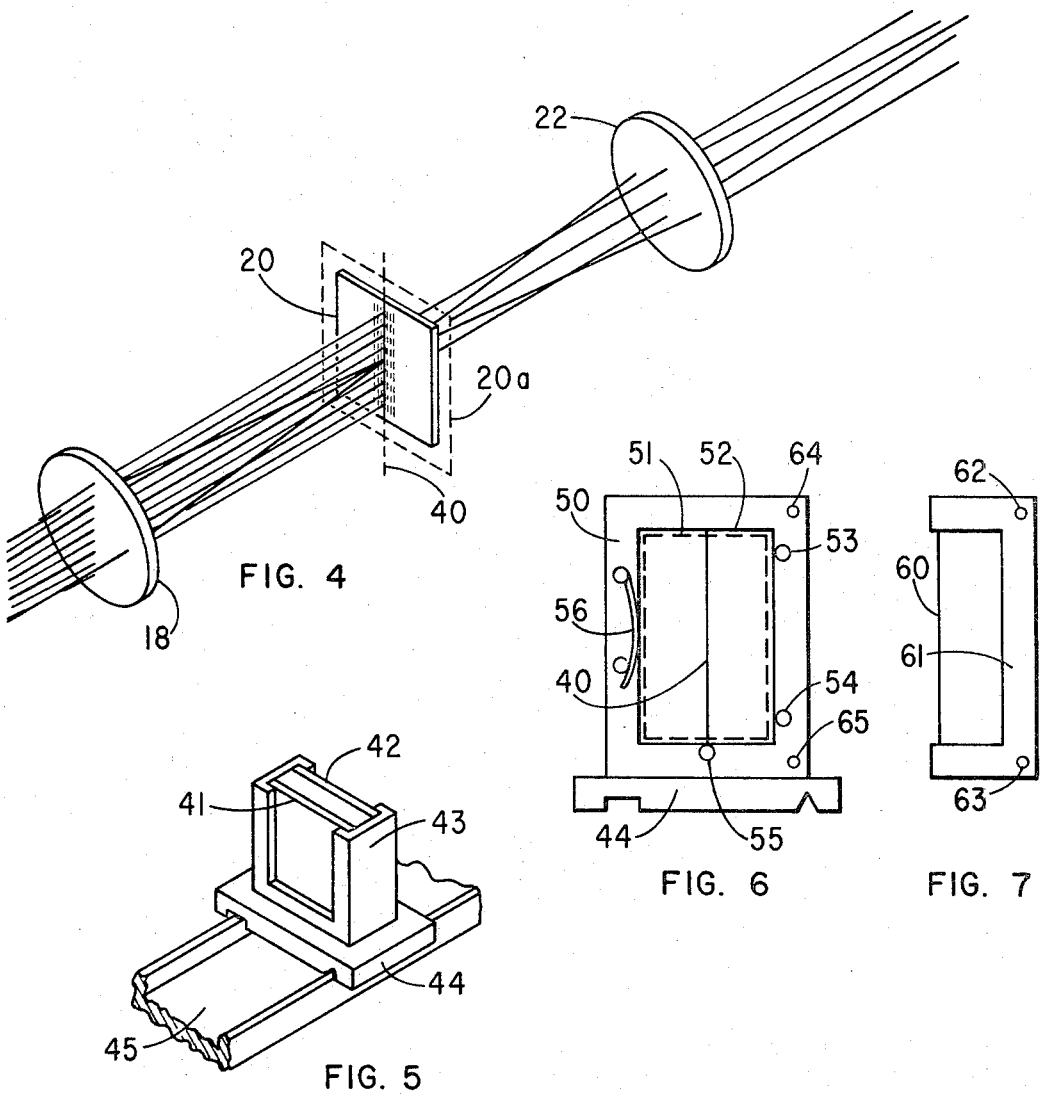
JOHN B. FARR
HAROLD M. LANG
MOSES B. WIDESS
        INVENTORS
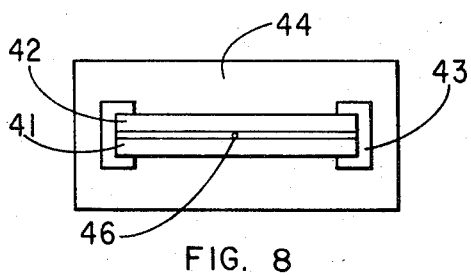
ATTORNEY

United States Patent Office

3,418,626
Patented Dec. 24, 1968

3,418,626
OPTICAL DECONVOLUTION OF
SEISMIC RECORDS
John B. Farr and Harold M. Lang, Tulsa, Okla., and
Moses G. Widess, Fort Worth, Tex., assignors to Pan
American Petroleum Corporation, Tulsa, Okla., a corporation of Delaware
Filed Dec. 27, 1967, Ser. No. 693,879
16 Claims. (Cl. 340—15.5)

ABSTRACT OF THE DISCLOSURE

In an optical method of processing seismic data in the form of a variable-density multi-trace record or cross-section transparency, deconvolution of all traces is done simultaneously in a one-dimensional Fourier transform (frequency) plane by a photographic or photochromic film that selectively has or acquires opacity at the particular frequencies that predominate in each trace. The deconvolution is thus an amplitude "spectrum-flattening" operation that discriminates against reverberations, multiple reflections, and like waves, which are a kind of "resonant interference" that often obscures primary reflections.

Background of the invention

This invention relates to seismic geophysical surveying, and is directed to a method and apparatus for processing seismic data in the form of variable-density seismic records or cross-sections. More specifically, the invention is directed to a type of frequency-discrimination processing of seismic records commonly called deconvolution, which may aid the identification of primary reflections by selectively reducing the amplitude of reverberations, multiple reflections, and like interfering waves that are often present in the data traces as a kind of "resonant interference."

Deconvolution, as a method of processing seismic data traces by the use of digital computer programs, has achieved recognition as especially valuable in improving the signal-to-noise ratio for finding primary reflections, by significantly reducing such interferences as water-layer reverberations, multiple reflections, and the like. The process, however, is a relatively costly one in terms of computer operating time and expense, being limited to one trace at a time, and sometimes requiring more than one computation to find an optimum value of deconvolution for each trace. Carrying the deconvolution too far tends to wipe out the primary reflections, which themselves have spectra that are not completely flat but possess one or more maxima. That is, the ultimate result of deconvolution is to achieve a completely flat spectrum, which is what characterizes random noise. Deconvolution, to be successful, must therefore stop short of removing the primary reflections themselves.

The general procedure of optical data processing and filtering has been described in several publications, such as the paper "Optical Data Processing and Filtering Systems," by L. J. Cutrona et al., in IRE Transactions on Information Theory, June 1960, pp. 386–400. Specific applications of these techniques to filtering seismic waves have been described by P. L. Jackson in the paper "Analysis of Variable Density Seismograms by Means of Optical Diffraction," Geophysics, vol. XXX, No. 1, February 1965, pp. 5 to 23, and by M. B. Dobrin et al., in the paper "Velocity and Frequency Filtering of Seismic Data Using Laser Lights," Geophysics, vol. XXX, No. 6, December 1965, pp. 1144–1178. In general, however, these prior-art data processing and filtering systems or procedures have been limited to the complete removal of certain frequency components by placing opaque masks, wires, and the like in the frequency plane. The results of these processes, while beneficial in many instances, differ from true deconvolution in that, by the elimination of certain frequencies or by selecting frequency bands or limits, they reduce or restrict the band width of the resulting signals whereas deconvolution only limits the amplitudes of the various frequency components, equalizing them without completely eliminating them.

In view of the foregoing, it is a primary object of our invention to extend the techniques of optically processing seismic data to include deconvolution, particularly in such a way as to vary the degree of amplitude spectrum flattening to achieve and pass through an optimum value of primary reflection signal-to-noise ratio.

Summary of the invention

This is accomplished by utilizing the property of photographic or photochromic films to acquire density or opacity with exposure or light intensity in a non-linear manner. Specifically, by placing such a film in the Fourier transform or frequency plane of an opitical data processing system, the light intensity concentrations which correspond to spectral frequency maxima develop opacity (after development in the case of photographic films) more rapidly and to a greater extent than do other spectral regions. This is particularly true of certain photographic films which possess an extended region of non-linearity in their H-D characteristic curves before a generally linear relationship between the logarithm of the exposure and resulting density (after development) sets in. That is, each trace frequency transform produces on a photographic or photochromic film its own density filter for modifying the light transmitted through the frequency plane into a lens system which converts the transmitted energy into a modified image.

While it is possible to perform deconvolution in this way by exposing a photographic film, processing it to a fixed set of density values, and reinserting it in the frequency plane, it is preferred to let the density or opacity pattern develop in place over a period of time while successive records are made of the images reconstructed from the filtered energy passing through the transform plane, one of which records must necessarily constitute an optimum deconvolution.

Brief description of the drawings

This will be better understood by reference to the accompanying drawings forming a part of this application and showing a preferred embodiment of this invention and a number of modifications thereof. In these drawings.

FIGURE 4 is an enlarged diagrammatic perspective view of the transform plane of FIGURE 1 used for deconvolution;

FIGURE 5 is a perspective view of a transparent cell for holding a deconvolution film or medium;

FIGURE 6 is a detailed elevation view of a film-holding means;

FIGURE 7 is an elevation view of a mask device for use with the holder of FIGURE 6, and FIGURE 8 is a plan view of a modified form of the cell of FIGURE 5.

Description of the preferred embodiments

Figure 1:
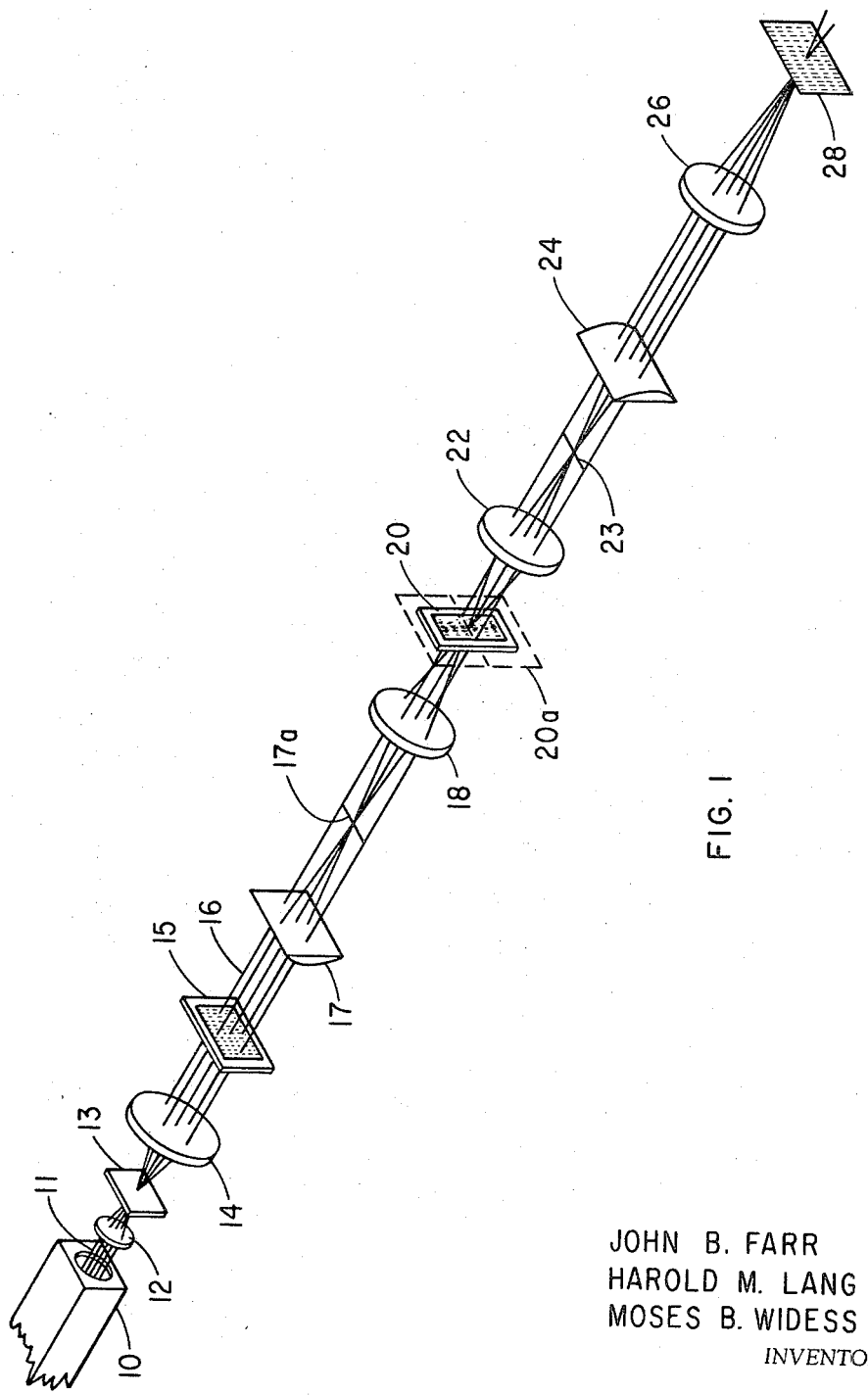
FIGURE 1 is a diagrammatic perspective view of an optical processing system embodying the invention.

Referring now to these drawings in detail and particularly to FIGURE 1 thereof, the elements shown diagrammatically from left to right in this figure are the successive elements through which light passes from a source to a final image. Thus, the light source is preferably a continuously emitting gas laser 10 of a commercially available type producing a narrow parallel beam 11 of monochromatic coherent radiation, which beam is focused by a condensing lens 12 onto a pin-hole mask 13 at the focus of a collimating lens 14. It is a function of condenser 12, pinhole 13, and collimator 14 to select a single laser spatial mode and expand the beam 11 of laser 10 to a sufficient area of plane-wavefront, parallel light to cover the area of a seismic data cross-section 15 to be deconvolved. Section 15 is in the form of a reduced-scale photographic transparency of variable-density traces, the time (or depth) dimension of which in this drawing is assumed to extend horizontally, while the vertical coordinate represents horizontal distance or position of corresponding reflection points along a profile line. Expanded beam 16, transmitted through and diffracted by the section 15, next passes through a positive cylindrical lens 17 with its cylindrical axis parallel to the time dimension of section 15 and therefore horizontal, and thence through a positive spherical lens 18 to a transform at its focal plane 20a in which is located a deconvolution transparency 20, which will be described in more detail below. The beam passing through and modified by transparency 20 is re-transformed by a combination of a positive spherical lens 22, a positive cylindrical lens 24, and a positive spherical lens 26 into a final image 28 of the same form as section 15, except for being modified by deconvolution at the transform plane 20a occupied by deconvolution film 20.

The manner in which this system transforms the data of section 15 to a combination image and frequency transform at plane 20a and retransforms the transmitted energy into an image at 28, will now be explained by reference to FIGURES 2A and 2B. In the vertical cross-section view represented by FIGURE 2A, the cylindrical lens 17 operates to produce at its focus 17a a one-dimensional transform of only the distance dimension of section 15. The transform at 17a is then retransformed by spherical lens 18 to an inverted image of the trace positions of the section 15 at plane 20a.

Figure 2A:
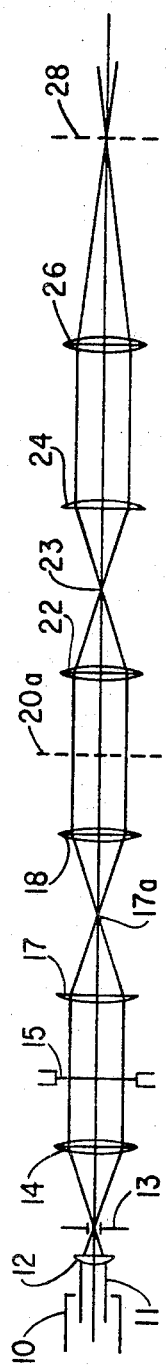
FIGURES 2A and 2B are respectively diagrammatic cross-section views of the system of FIGURE 1 in orthogonal planes, respectively perpendicular to the time and to the distance dimensions of the data section.
Figure 2B:
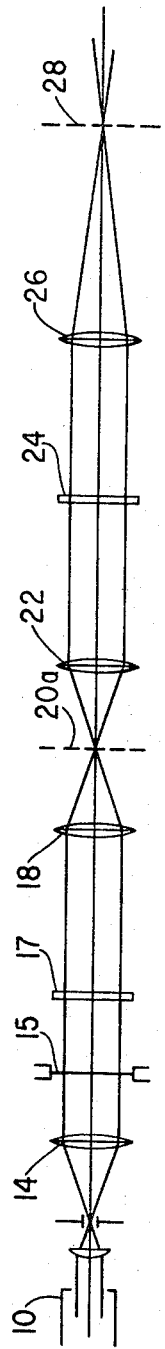

In the orthogonal horizontal cross-section plane of FIGURE 2B, which is parallel to the time axis of section 15 and to the longitudinal axis of cylindrical lens 17, the latter lens is without effect in producing a transform, and accordingly the spherical lens 18 produces at its focus 20a a Fourier transform of the time dimension of section 15 superimposed on the trace-position images of FIGURE 2A. That is, except for image inversion from top to bottom, a frequency transform of the time dimension of each trace appears at the respective trace-position image. Accordingly, the frequency spectrum of each trace can be individually modified by a varying pattern of opacity at its corresponding trace position, which pattern selectively reduces the amplitudes of the dominant frequencies in the beam energy transmitted through the film 20 at plane 20a.

The formation of the final image 28 from the trace image and the time transform at plane 20a occurs as follows: The image of plane 20a in FIGURE 2A is converted by spherical lens 22 to a transform at its focus 23, corresponding to the transform 17a. The transform at 23 is retransformed by cylindrical lens 24 to an image that is enlarged and transferred by the final imaging lens 26 to the image plane 28. Simultaneously, the transform at plane 20a in FIGURE 2B is converted by spherical lens 22 to an image on which the cylindrical lens 24 is without effect, which image is also enlarged and transferred by imaging lens 26 to the final imaging plane 28. Thus, the deconvolved image of section 15 appears at plane 28 where a photographic film can be placed for recording it.

Figure 3A:
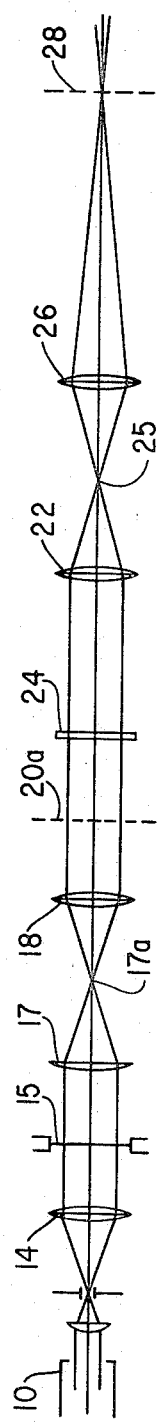
FIGURES 3A and 3B are alternative embodiments of the optical arrangement depicted in FIGURES 2A and 2B.
Figure 3B:
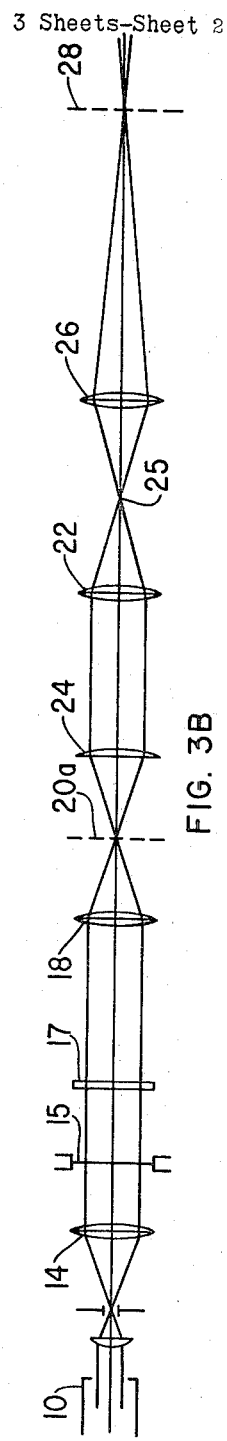

Alternatively, the deconvolved final image can be obtained as in FIGURES 3A and 3B, respectively corresponding to FIGURES 2A and 2B. In FIGURE 3A the beam transmitted through plane 20a first passes the cylindrical lens 24 having its axis oriented 90° relative to its orientation in FIGURE 2A. Accordingly, the image at plane 20a of the trace positions on section 15 is not affected by lens 24 but is converted by spherical lens 22 to a horizontal-distance transform at its focus 25. In the orthogonal plane shown in FIGURE 3B, the cylindrical lens 24 converts the time-dimension transform of plane 20a to an image which is retransformed by spherical lens 22 to a time-dimension transform at focus 25. The final imaging lens 26 accordingly retransforms the superimposed distance and time transforms at focus 25 to the final image at plane 28.

Referring now to FIGURE 4, this figure shows in further detail the nature of the deconvolution film 20 at the transform plane 20a between lenses 18 and 22. In this plane the horizontal dimension is now frequency instead of time, while the vertical dimension corresponds to distance along a profile line the same as in the section 15. A vertical line 40 in the center of the transform is the zero-frequency axis, also called the DC line, perhaps by analogy to electrical current. Deviations from this axis in either direction represent increasing values of frequency. That is, the varying intensity of illumination in the horizontal direction of trace extension either direction from line 40 is a variable-intensity representation of the trace frequency spectrum. The points of highest illumination accordingly identify the component frequencies of greatest amplitude. As it is at precisely these positions that points of maximum density occur on film 20, these are the precise frequencies which have their amplitudes most reduced in the final image 28. The way in which the film 20 is produced will now be explained with reference to FIGURES 5, 6, 7 and 8.

FIGURES 1 to 4, inclusive, have been diagrammatic rather than illustrative, it being understood that the various optical elements are normally supported in alignment by conventional means such as the optical bench and lens mounts shown in the Geophysics articles above referred to. FIGURE 5 is a perspective view of a transparent liquid cell, and an optical-bench mounting for it, suitable for use in various embodiments of the present invention. This cell comprises, for example, a pair of horizontally spaced optically flat vertical glass plates 41 and 42 sealed liquid-tight in a supporting frame 43 open at the top and attached to a base 44 having notches that engage the accurately machined edges of a steel rail or channel 45 that extends parallel to the optical axis of the system. With this construction, the base 44 is slidable along the length of channel 45, each of the elements of the system of FIGURE 1 being similarly mounted so that it remains on the optical axis of the system while being movable longitudinally. Conventional locking means, not shown, maintain each element in fixed position after final adjustment.

In accordance with a preferred embodiment of our invention, the transparent cell of FIGURE 5 is made as shown in FIGURE 8, with a narrow space between the glasses 41 and 42, which space is divided into two halves by a vertical transparent glass fiber 46 so located as to extend along the DC line 40 of FIGURE 4. The remaining space between glasses 41 and 42 on either side of fiber 46 is filled by a solution or transparent dispersion of photochromic material in liquid, preferably one that is in the form of a very viscous solution or semi-solid gel. Various suitable photochromic materials, as well as solvents for them, are described in U.S. Patent 3,085,469, columns 14–16, and in the other patents referred to in column 14 of that patent. In general, these materials, also referred to as "metachromatic" materials, are spiropyrans dissolved in an alcohol or liquid hydrocarbon solvent.

In operation, with cross-section 15 in place and cell 43 located at the transform plane 20a, laser 10, emitting light of a wave length to which the photochromic material is sensitive, is turned on, and opacity begins to develop in film 20 at the points in plane 20a where the illumination is brightest, corresponding to the frequency components of highest intensity. The development of opacity at DC line 40 is prevented by fiber 46, which therefore transmits the DC or undiffracted light that is useful in forming the filtered final image of plane 28. With continued illumination by laser 10, the density distribution pattern continues to increase in opacity at transform plane 20a, so that by making successive photographs of the image at plane 28, a succession of displays is produced of differing degrees of deconvolution, one of which will be near to an optimum for any particular section 15.

Instead of filling cell 43 with a photochromic solution, it may be filled with an electrolyte and provided with transparent conducting films as electrodes on the insides of glasses 41 and 42, one film including cadmium sulfide selenide. A potential of proper polarity applied across the cell causes formation of an opaque coating in a pattern determined by the cadmium sulfide selenide resistivity, as modified by the illumination in transform plane 20a. This form of cell is described in Journal of the Optical Society of America, vol. 56, No. 6 (June 1966), pp. 828–829.

Apparatus for making a deconvolution film 20 in accordance with alternative embodiments of the invention is shown in FIGURE 6. Mounted on the base 44 for positioning at the plane 20a is a rectangular frame 50 having a central rectangular opening 51 across which is placed a glass plate 52 coated with a photographic emulsion. As the precise positioning of plate 52 is important, frame 50 is provided with register pins 53 and 54 and a vertical stop 55, the plate 52 being pressed laterally against register pins 53 and 54 by a leaf spring 56.

In FIGURE 7 is shown a means for providing DC for final imaging at plane 28. This comprises a thin wire 60 held taut in a frame 61 provided with holes 62, 63 that register with locating pins 64 and 65, respectively, on frame 50.

In operation, in the absence of light, an unexposed photographic plate 52 is placed in frame 50 and covered by wire 60, which is arranged to extend along DC line 40 in FIGURE 4. A photographic exposure is then made of a length found by experience or by trial and error to provide a desired or acceptable amount of deconvolution. Plate 52 is then removed from holder 50 and photographically processed to produce the desired density pattern corresponding to the trace-by-trace frequency spectra of film 20 in FIGURE 4. Upon then replacing the developed film against stop 55 and pins 53 and 54 in holder 50, omitting wire 60 and frame 61, the developed density pattern of plate 52 acts as the deconvolution film 20 in producing a final deconvolved image 28. In processing any given seismic section, it is desirable to prepare two or more deconvolution plates 52 in order to provide a choice of the degree of deconvolution in the final display.

In accordance with still another embodiment of our invention, the transparent holder 43 is utilized, not with a photochromic medium but with an unexposed photographic glass plate 52 immersed in a developing bath in the space betwen plates 41 and 42. If the photographic sensitivity of plate or film 52 is low, it is possible to turn on laser 10 and let it continuously illuminate the film 52, in cell 43 surrounded by developer, while density slowly builds up due to the continuing exposure and immediate development. Making a number of successive photographic records of the deconvolved image at plane 28 while this density build-up occurs in cell 43, on the plate 52 acting as the film 20, insures that one record is obtained at the optimum degree of deconvolution. Alternatively, if film 52 is too sensitive for continuous illumination, it may be exposed by short bursts of exposure from laser 10, each burst, for example, being that required to produce a satisfactorily exposed image at plane 28. Or a combination of continuous and intermittent exposure can be used, allowing time for development of additoinal density on plate 52 from each successive exposure before making each of a succession of records of the final image at plane 28. If desired, some shadowing-mask arrangement such as the wire 60 and frame 61 can be used for the initial exposures and removed at about the time when optimum deconvolution is to be expected, so that an unexposed area of the film 52 along the line 40 will be available for DC transmission.

As an alternative to surrounding plate 52 with a developing bath in cell 43, the cell may be omitted and the plate, wetted with a fairly concentrated solution of developer, placed in frame 50 in the open air, immediately prior to use. The emulsion can ordinarily retain sufficient developer to produce adequate density during the following intermittent or continuous exposure. The wire 60 and frame 61 can be left in place during the initial part of the density build-up, to provide DC transmission while passing through the stage of optimum deconvolution.

Still another way of providing DC transmission at line 40 is to remove the emulsion layer from an unexposed plate 52 along the line 40 by an engraving tool or the like prior to placing the plate in a positioning frame like frame 50, the plate being either pre-wetted with developer or submerged in a developing bath in cell 43. Opacity is thus prevented from building up along the position of line 40. Alternatively, two pieces of film with a small gap between them at the position of DC line 40 can be used.

While the deconvolved images 28 formed utilizing DC energy from line 40 in the reconstruction process are preferred because they correspond more closely to the original sections 15 in appearance, images formed without any DC utilizing only the diffracted energy, are also useful. They are in general equivalent to the derivative or slope of the deconvolved wave functions shown by the DC-containing images 28 and therefore exhibit frequency doubling along with increased sharpness or time resolution.

Although deconvolution has been described as the process carried out by our invention, this is only one form of time-varying filtering operation in which it is useful. Photographic, photochromic, and electrolytically deposited films or layers have been presented chiefly as examples of suitable deconvolution film materials, it being understood that in general any material capable of having its transparency altered by the illumination in the transform plane 20 may be adapted for this use. Since, in view of the foregoing disclosure of our invention in its various modifications and embodiments, still further modifications will be apparent to those skilled in the art, the invention should not be considered as limited to the embodiments described, but its scope is to be ascertained from the appended claims.

We claim:
1. In the method of optically processing seismic data in the form of a transparency of side-by-side variable-density seismic-wave traces, which method comprises the steps of passing a plane-wavefront beam of monochromatic light through said transparency, to be transmitted and diffracted thereby, producing from said transmitted and diffracted light a Fourier transform of only the time dimension of said transparency, said transform containing as a varying intensity of illumination the frequency spectrum of each of said traces superimposed on an image of the respective trace position in said transparency, and producing from the illumination passing through the plane of said transform an image of said transparency, the improvement which comprises the step of interposing in said beam at said transform plane a transparent film that progressively acquires density by being exposed to the illumination in said transform, the greater intensities of said illumination producing relatively greater densities than do the lesser intensities, and in which improvement said image-producing step is repeated a plurality of times for a plurality of different densities of said transparent film.

2. The improvement as in claim 1 in which said transparent film is unexposed photographic film and said interposing step comprises first exposing said film to said illumination in said beam, withdrawing said exposed film, photographically processing it, replacing said processed film in said beam in the same position where it was exposed, and repeating said film-exposing, withdrawing, processing and replacing steps to provide at least a second film of different density.

3. The improvement as in claim 1 in which said transparent film is an unexposed photographic film and said interposing step comprises exposing said film, in the presence of a developer, to said illumination in said beam, and said image-producing step is repeated a plurality of times during the building-up of density in said film by continued and concurrent exposure and development.

4. The improvement as in claim 1 in which said transparent film is an unexposed photographic film and said interposing step comprises intermittently exposing said film, in the presence of a developer, to said illumination in said beam, and said image-producing step is repeated a plurality of times for a plurality of exposures during the building up of density on said film by the alternating of exposure and development.

5. The improvement as in claim 1 in which said transparent film is a photochromic film, and said image-producing step is repeated a plurality of times during the building-up of density in said photochromic film with continuing exposure.

6. The improvement as in claim 1 including the further step of passing at least a part of the illumination representing zero frequency in the frequency spectrum through said transform plane without substantial absorption by said film.

7. An optical processing system for seismic data in the form of a transparency of side-by-side variable-density seismic-wave traces, said system comprising means including a source of monochromatic light for producing a plane-wavefront beam of illumination and propagating it along an optical axis, means for holding said transparency on said axis and in said beam, to transmit and diffract said illumination, a cylindrical and a spherical lens arranged on said axis to produce from said transmitted and diffracted illumination, at a focal plane of said spherical lens and at a position in said plane corresponding to the respective trace position on said transparency, a Fourier transform of each of said traces, a deconvolution film in said transform plane having a distribution of density derived from exposure to the distribution of luminous intensity over said plane, said density being, for points of high intensity corresponding to dominant frequency components in the spectra of said seismic waves, proportionately greater than for points of medium or low intensity, and a lens system for forming, from the illumination passing said deconvolution film, a modified image of said transparency in which said dominant frequencies are substantially reduced or eliminated.

8. An optical processing system as in claim 7 in which said deconvolution film is a processed photographic film with a fixed density distribution, and including means for re-positioning said processed film in said transform plane at substantially the exact position occupied by said film during exposure to said luminous intensity distribution.

9. An optical processing system as in claim 8 including means for preventing exposure of said film along a line representing zero frequency in said transform plane.

10. An optical processing system as in claim 7 in which said deconvolution film is one which progressively acquires density by exposure to said luminous intensity distribution while passing illumination to form said modified image.

11. An optical processing system as in claim 10 in which said deconvolution film is a photochromic material.

12. an optical processing system as in claim 11 in which said photochromic material is a solution and including a transparent cell for holding a layer of said solution in said transform plane.

13. An optical processing system as in claim 11 including transparent means to exclude said photochromic material along a line representing zero frequency in said transform plane.

14. An optical processing system as in claim 10 in which said deconvolution film is an initially unexposed photographic film in the presence of a developer.

15. An optical processing system as in claim 14 including a transparent cell, and a developing solution in said cell in which said film is immersed.

16. An optical processing system as in claim 14 in which said unexposed film includes a developing agent within and wetting the film emulsion layer.

References Cited

UNITED STATES PATENTS 3,370,268   2/1968   Dobrin et al. _____ 340—15.5

RODNEY D. BENNETT, *Primary Examiner.*

C. E. WANDS, *Assistant Examiner.*

U.S. Cl. X.R.

350—162, 160; 88—1; 340—282